P. A. CHRISTENSEN.
EXCAVATING MACHINE.
APPLICATION FILED FEB. 25, 1915.
1,171,771.
Patented Feb. 15, 1916.
2 SHEETS—SHEET 1.
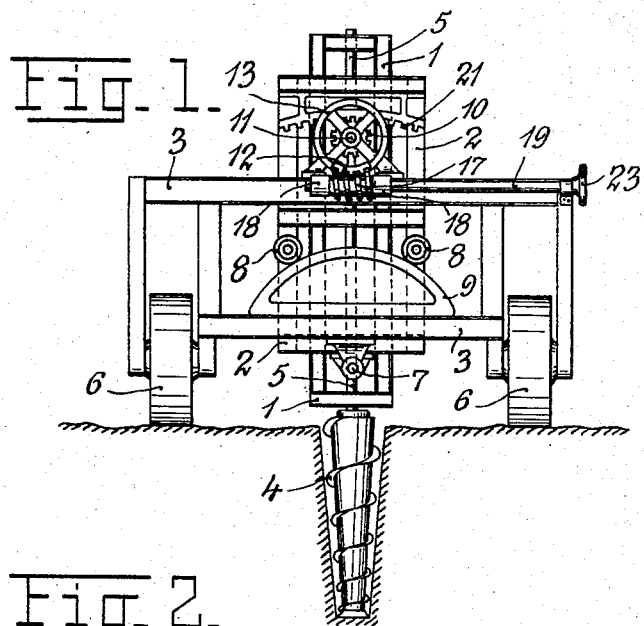
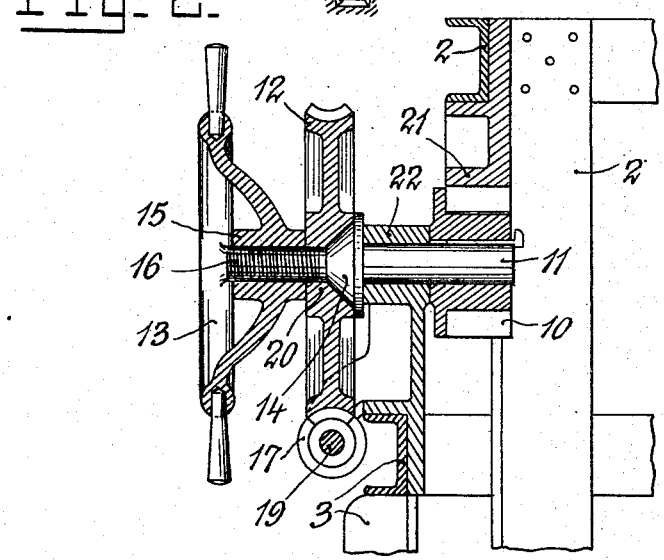
Witnesses:
John C. Sanders
Albert F. Heuman
Inventor:
Peter August Christensen
Attorney P. A. CHRISTENSEN.
EXCAVATING MACHINE.
APPLICATION FILED FEB. 25, 1915.
1,171,771.
Patented Feb. 15, 1916.
2 SHEETS—SHEET 2.
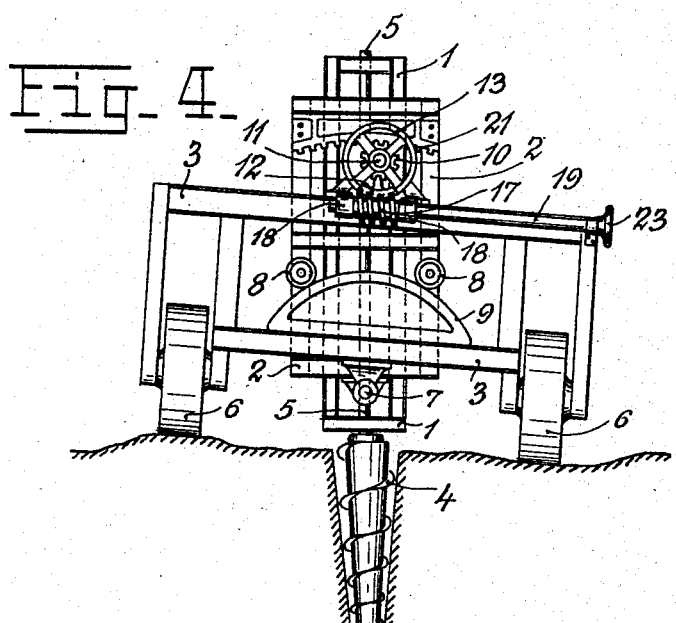
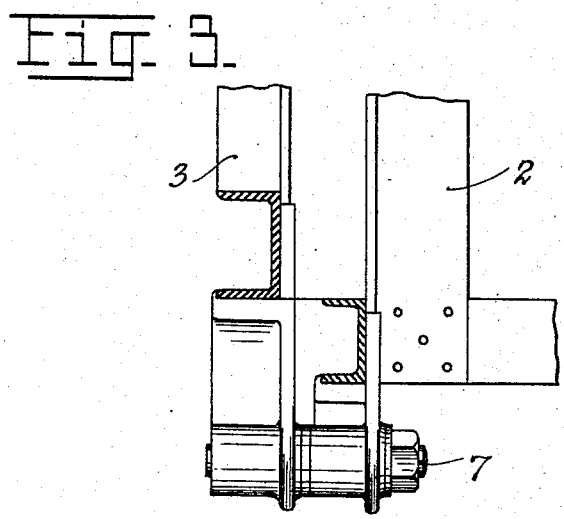

UNITED STATES PATENT OFFICE.

PETER AUGUST CHRISTENSEN, OF CHRISTIANIA, NORWAY, ASSIGNOR TO AURORA HANNEBORG, OF HAUGRIM, NORWAY.

EXCAVATING-MACHINE.

1,171,771.   Specification of Letters Patent.   Patented Feb. 15, 1916.

Application filed February 25, 1915. Serial No. 10,470.

*To all whom it may concern:*

Be it known that I, PETER AUGUST CHRISTENSEN, citizen of Norway, residing at Sandakerveien 16, Christiania, Norway, have invented new and useful Improvements in and Relating to Excavating-Machines, of which the following is a specifiction.

The present invention relates to the type of excavating machines for producing ditches in which the carrying frame of a rotating excavating screw may be adjusted vertically on a second frame, which in turn has a controlled pivotal connection with a third frame traveling on wheels upon the ground. The pivotal movement takes place about a horizontal axis parallel to the excavating direction in such a manner that the screw or its carrying frame retains as much as possible its vertical position, even if the machine during its forward travel upon the ground passes uneven or sloping places, where the said frame must of necessity take up an inclined position relatively to the vertical direction. In order to be able to retain this said vertical position the previous machines of the kind referred to have been provided between the second and third frame with a mechanical gear device, which is operated by the machine itself during its forward movement, the said device being furnished with the necessary driving force for movement in one or the other direction by means of a reversible clutch, the coupling member of which is adjusted by a freely suspended weight.

Experience has shown that the adjusting mechanism above referred to acts too slowly and consequently in many cases such action has an opposite effect to the desirable one, because the moving-back of the screw carrying frame to a vertical position could obviously take place only when the machine had traveled some distance forward, whereby it had often arrived at places where such moving-back was unnecessary or even undesirable. Especially this took place, when one side of the machine passed for instance a little hillock on the ground. The consequence of this slow moving back was that the excavating screw and several other essential parts of the machine were subjected to incessant breaking strains, which often resulted in ruptures or in any case they caused increased expenditure of power to a useless extent. These drawbacks are obviated in a simple manner according to the present invention by the arrangement of such a clutch or coupling device in the pivotal connection between the said second and third frame, that when the said device is in a locked position the pivotal movement can take place only by hand or by mechanical power transmission whereas, after the clutch has been released the two frames can pivot freely in relation to each other.

My invention is illustrated by way of example in the accompanying drawing, in which:

Figure 1 illustrates the machine partly diagrammatically, working on a horizontal ground. Figs. 2 and 3 illustrate on a larger scale, details of the coupling device and the pivotal connection. Fig. 4 illustrates the machine during its work upon a sloping ground.

The shaft —5— of the excavating screw —4— is journaled in the frame —1—, which, by suitable mechanism (forming no part of the present invention) can be adjusted vertically within a second frame —2—, which in turn is turnable in relation to a third frame —3— traveling on wheels —6— upon the ground. The turning or pivotal movement takes place about two pins —7— located at a small distance above the ground. The frame —2— has guiding rollers —8— traveling on curved rails —9—; the center of which is located in the axis of the pins —7—.

According to the present invention the frame —2— is provided at its upper part with a curved rack —21—, intermeshing with a pinion —10—, keyed to a shaft —11—. The latter is rotatably journaled in a bearing —22— (Fig. 2) attached to the frame —3— and carries idly a worm wheel —12—, the hub —20— of which may be pressed by means of a hand wheel —13— against a friction cone —14— on the shaft —11—, the hand wheel —13— acting as a nut on the outer threaded end portion —16— of the screw as shown in Fig. 2. The worm —17—, which rests in fixed bearings —18— on the frame —3—, meshes with the said worm wheel —12—. The shaft —19— of the worm carries at its end a hand-wheel —23— (Fig. 1).

Fig. 3 shows the arrangement of one of the two pins —7— which connect together the lower parts of the frames —2— and —3—.

The operation is as follows: At the place in the ground in which it is desired to work, a hole is made by hand and above the same the machine screw —4— is brought in position. The hand wheel —13— is screwed tight, so that the coupling device —20—, —14— forms a frictional connection between the worm wheel —12— and the shaft —11—. By means of the wheel —23— or by power transmission to the shaft —19— the frames —1— and —2— can be adjusted to be vertical even if the outer frame —3— is inclined. Then the screw —4— is lowered into the said hole and the machine is started. After having moved forward a short distance, for instance 10 centimeters, the screw has obtained a safe side-support in the earth. Now the hand wheel —13— is released so that the friction-connection between the worm wheel —12— and the shaft —11— is interrupted. The two inner frames —1— and —2— therefore now can turn freely about the pins —7— in relation to the outer frame —3—. The latter consequently now can yield to all unevennesses of the ground and may adjust itself freely (see Fig. 4), whereas the inner frames —1— and —2— will retain their given vertical position supported by the screw —4— projecting down into the ground. Breaking influences on the screw, as a cause of unevennesses on the ground surface, are therefore obviated. Moreover, in case the screw during its excavation should meet larger or smaller stones in the earth, it may turn to the side and thereby pass by such stones without breakings being caused which would be unavoidable if the frames —1, 2— could not swing freely in relation to the frame —3—. Then the work is completed, the hand-wheel —13— is again screwed tight, before the frame —1— is raised for raising the screw —4— up from the produced ditch.

Having now described my invention, what I claim as new and desire to secure by Letters Patent is—

1. In an excavating machine, the combination of a vertical excavating screw, means for rotating the same, a carrying frame for the screw, a second frame, means for adjusting said first frame vertically on the second frame, a third frame traveling on wheels, longitudinal pins forming a rocking connection between the second and third frames, a self-locking operating mechanism for rocking the second frame upon the third frame, and a releasable coupling inserted in the said mechanism, so that the pivotal movement of the second frame upon the third frame may be effected only by hand or by mechanical power transmission, whereas, after the coupling has been released, the two frames may turn freely in relation to each other.

2. In an excavating machine, the combination of a vertical excavating screw, means for rotating the same, a carrying frame for the screw, a second frame, means for adjusting said first frame vertically on the second frame, a third frame traveling on wheels, longitudinal pins forming a rocking connection between the second and third frame, a curved rack and intermeshing gear wheel, one of which is carried by the second frame and the other carried by the third frame, the rack being concentric with the axis of the said pins, a self-locking operating mechanism for adjusting the said gear wheel, and a releasable coupling inserted in the said mechanism, so that the pivotal movement of the second frame upon the third frame may be effected only by hand or by mechanical power transmission, whereas, after the coupling has been released, the two frames may turn freely in relation to each other.

3. In an excavating machine, the combination of a vertical excavating screw, means for rotating the same, a carrying frame for the screw, a second frame, means for adjusting said first frame vertically on the second frame, a third frame traveling on wheels, longitudinal pins forming a rocking connection between the second and third frame, a curved rack and intermeshing gear wheel, one of which is carried by the second frame and the other carried by the third frame, the rack being concentric with the axis of the said pins, a self-locking operating mechanism for adjusting the said gear wheel, and a releasable coupling inserted in the said mechanism, the coupling comprising a driving wheel arranged idly upon its shaft, a conically bored hub in frictional coöperation with a corresponding cone on said shaft, said operation being controlled by a hand wheel with a nut-like hub arranged outside the wheel on a threaded end portion of the shaft in order to be capable of being pressed forcibly against the cone by rotation of the hand-wheel, so that the pivotal movement of the second frame upon the third frame may be effected only by hand or by mechanical power transmission, whereas, after the coupling has been released, the two frames may turn freely in relation to each other.

In testimony whereof, I have signed my name to this specification in the presence of two subscribing witnesses.

PETER AUGUST CHRISTENSEN.

Witnesses:
 AXEL ZAHN,
 MOGENS BUGGE.

Copies of this patent may be obtained for five cents each, by addressing the "Commissioner of Patents, Washington, D. C."